United States Patent Office 2,706,397
Patented Apr. 19, 1955

2,706,397

APPARATUS FOR GAUGING DIMENSIONS OR OTHER PHYSICAL CHARACTERISTICS

Elwood L. Byrkett, Dayton, Ohio, assignor to The Sheffield Corporation, Dayton, Ohio, a corporation of Ohio Application March 16, 1950, Serial No. 149,990

7 Claims. (Cl. 73—37.5)

This invention relates to gauging apparatus and more particularly to apparatus in which a flow of fluid is employed in gauging a characteristic such as the size of an article.

One object of the invention is the provision of a gauging apparatus capable of very accurately gauging the size or other characteristic of an article and capable of obtaining many different size selections by controlling different selecting devices connected to a common control part of the system.

Another object is the provision of a gauging device in which the amount of fluid flow in a gauging system varies with a characteristic to be determined, such system including a pressure chamber with means for accurately gauging the pressure of such chamber and adapted to measure pressure differentials which are exceedingly small.

Another object is the provision of a gauging device having provision for creating different pressures in a flow gauging system dependent upon the amount of flow taking place, with means for greatly amplifying the pressure changes and such that a number of different pressure responsive elements or gauging members can be controlled automatically.

Other objects and advantages of the invention will be apparent from the following description, the appended claims and the accompanying drawing, in which Fig. 1 is a schematic showing of a system embodying the present invention;

Fig. 2 is a detail shown in central vertical section through one of the diaphragm housings;

Fig. 3 is a similar view of another diaphragm housing;

Fig. 4 is an end view on a reduced scale of the diaphragm housing; and

Fig. 5 is a schematic showing of a modified form of construction.

In the drawing, Fig. 1 shows one embodiment of the invention incorporated in a fluid system for obtaining a number of selections in the size or other characteristic of an object gauged. In this system small changes in the pressure existing in the gauging circuit are greatly amplified in the measuring portion of the device, adapting the device to measurements with great sensitivity.

In this arrangement air under pressure is supplied to a pipe 10 leading to a pressure regulator 11. A secondary pressure regulator 12 is connected in series with regulator 11 and with an adjustable air restricting valve 13 which leads through a pipe 14 to a gauging head 15. This gauging head may take any one of a great many different forms depending upon the purpose of the gauging device. For example, it may be a gauging arm held at a fixed distance from an article support to gauge the width of the article 17 or the gauging head may be placed in direct contact with an article surface for gauging surface roughness. The gauging head is provided with an air leakage gauging nozzle or orifice 18 the terminal end of which cooperates with the part to be gauged so that air flows out from the gauging orifice at a rate depending upon the spacing between the end of the orifice and the article, or the space provided by the crevices or scratches in the article where the end of the nozzle is in direct contact with a surface gauged. By comparing the pressure existing in the pressure chamber that exists ahead of the gauging orifice 18 when the article is in place with the pressure that obtains when an article of standard size is applied to the gauging head, the deviation in size of the article may be obtained. It will be understood that the pressure regulators 11 and 12 may be so adjusted as to give a desired output pressure to the restrictor 13 which may be manually operated to produce greater or less restriction to the air flow depending upon the particular gauging operation to be performed.

The pressure existing in the pressure chamber just ahead of the nozzle 18 is supplied through pipe 19 to a closed air chamber 20, see Fig. 3, where it is effective on one side of a flexible diaphragm 21 so that it will deflect this diaphragm to an extent dependent upon the pressure existing in the pressure chamber. The diaphragm 21 is preferably a thin flat metal sheet clamped throughout its peripheral portions between a housing wall 22 and an end wall 23. The housing wall 22 has a very shallow flange 24 where it contacts the diaphragm so that the volumetric capacity of the chamber 20 is quite small. The end wall 23 is recessed to provide a space 25 which is freely open to the atmosphere through one or more openings 26. Carried by the end wall 23 is an air leakage nozzle 27 arranged at the end of a tube 28, the end of this nozzle facing towards and being normally slightly spaced from the diaphragm 21 so that air which is supplied under pressure through the tube 28 flows out from the end of the nozzle at a rate dependent upon the spacing between the nozzle and the diaphragm. Surrounding the end of the nozzle there may be a stop ring 29 having passages or openings 30 so that the diaphragm deflection will be stopped at some limiting point before it actually contacts with the nozzle. The drawing shows the spacing between the nozzle and the diaphragm greatly exaggerated since it is only a few thousandths or possibly a few ten-thousandths of an inch where accurate gauging is desired.

Air is supplied under pressure to the tube 28 from the pressure regulator 11, pipe 31, pressure regulator 32, pipe 33 and an adjustable air restrictor 34 which leads to a switch block 35 having a passage 36 to which the tube 28 is connected. The pressure existing in the passage 36 and in the tube 28 will depend upon the rate of air flow from the nozzle 27 against the diaphragm and thence to the atmosphere. Very small changes in the position of the diaphragm may produce very considerable changes in pressure existing in the passage 36. Connected to the passage 36 are several gauging devices, shown as pressure responsive electric switches 38, 39 and 40 each containing a pressure responsive expansible element and a pair of switch contacts normally closed at some certain pressure in the passage 36 and selectively opened when this pressure is greater or less than some normal value that obtains within the range of acceptable tolerance limits. These switches may be of the character disclosed in Aller Patent 2,448,653 granted September 7, 1948. Each switch is provided with a pair of adjusting knobs 42 and 43 so that the contacts can be individually adjusted to be opened at different pressures and it will be understood that the adjusting knobs 42 and 43 of the various switches are so manipulated that the contacts will all operate at different pressures and thus cover a range of pressures. They may be connected in selection circuits so that a number of different selections can be made and control selecting gates or indicators.

Where only a comparatively few different selections are desired one switch block 35 may be sufficient but if a large number of different selections are to be obtained, the pressure chamber at the gauging head may be connected through a pipe 45 to control two diaphragms 46 and 47 arranged at opposite sides of an inner housing section 48 and clamped between that housing section and end sections 49 and 50 by means of suitable clamp screws 51. The housing section 48 has a passage 52 communicating with the tube 45 so that both of the diaphragms which may be of similar construction are similarly deflected in accordance with the pressure in the pressure chamber at the gauging head. The end sections 49 and 50 are provided with openings 53 so that the outer sides of the diaphragms are at atmospheric pressure. End section 50 has a supply pipe 54 leading to an air leakage nozzle 55 which is similar to the nozzle in the housing section 23. Similarly the end section 49 has a supply pipe 56 leading to a nozzle 57 which faces the diaphragm 46. The spacing between this diaphragm and the nozzle 57 is less than the spacing between the nozzle 55 and its adjacent diaphragm 47 so that by the time the diaphragm 46 substantially closes the nozzle 57, the diaphragm 47 will be deflected far enough to start effective control of the air flow from the nozzle 55 and thus as the pressure supplied to the inside of the diaphragms 46 increases, the diaphragm 46 will remain stationary against the stop ring that surrounds the nozzle 57 while the diaphragm 47 will move gradually towards the nozzle 55. The pipes 54 and 56 are connected respectively to switch blocks 60 and 61. Switch block 60 has a manifold passage 62 leading to a source of fluid pressure and to pressure responsive switches 63, 64 and 65 which are set to operate at different pressures from the fluid pressure switches 66, 67 and 68 that are connected to the manifold passage 69 in the switch block 61. The air supply to the switch block 60 comes from pressure regulator 70 and flow restrictor 71. Air can be supplied from pressure regulator 32 to the switch block 61 although preferably an independent pressure regulator is provided for this switch block just ahead of the restrictor 72 so that each switch block will have its own pressure regulator for adjustment purposes.

The switch blocks 60 and 61 and their associated switches may be used in conjunction with the flow amplifying device illustrated in Fig. 2 without using the switch block 35 and the flow amplifying device shown in Fig. 3, but by employing the three different switch blocks and three diaphragms and by having the spacing of each of the diaphragms and the nozzles associated with them all different at any one pressure, the pressure change that normally takes place between maximum and minimum limiting values in the tolerance range of the gauging head may be subdivided into three major subdivisions by the three different diaphragms and their associated nozzles and each of these subdivisions will be further subdivided by the several switches controlled by each diaphragm so that a great many different subdivisions or selections can be obtained, all within a normal acceptable size range.

In accordance with the present invention very minute changes in the position of the center of the diaphragm which cause rather wide changes in pressure existing in the actual measuring part of the system so that the device is extremely sensitive when a thin diaphragm of metal or other similar material is used. The pressure measurements may be obtained with great sensitivity in a fluid system in which the pressure changes or the actual pressure to be gauged or controlled is exceedingly small. Pressure changes of the order of a very small fractional part of an ounce per square inch are very readily perceived and operate electric switches in a system in which the pressure measured or controlled is the pressure of a fluid or is the pressure in a pressure chamber of a gauge for determining a physical characteristic of an object.

In the form of construction shown in Fig. 5, the gauging means instead of being electric switches controlled by different pressures existing in the measuring circuit, takes the form of an indicator that measures the rate of flow of air. Air is supplied through pipe 75 to a pressure regulator 76 and then flows up through an upwardly flaring tube 77 containing a float 78 which is raised to an extent depending upon the rate of flow. Air flows out from this tube to a pipe 79 which leads to the housing portion 80 having a diaphragm 81 contained between that housing portion and an adjacent housing portion 82. It should be understood that the housing portions 80 and 82 and the diaphragm are similar in construction to the housing arrangement shown in Fig. 3. The diaphragm 81 is subjected at one side to the pressure to be gauged or measured. This pressure may be that existing in the pressure chamber 84 that obtains between the gauging head 85 and an adjustable flow restrictor 86 which is connected in series with the pressure regulators 87 and 88. The gauging head may be of any desired character for gauging pressure changes, size thickness, surface roughness and so forth as required, but as illustrated in this figure for exemplary purposes it contains two spaced gauging orifices or nozzles 89 and 90 provided in arms 91 of the gauging head, the ends of the nozzles being spaced apart a distance slightly in excess of the width or diameter of a master or part 93 of standard or normal size so that when a part to be gauged is applied the deviation of that part from a desired size can be determined by comparing the indication of the float level with the indication obtained when using maximum and minimum masters in the gauging head.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gauging device comprising a gauging head, means for supplying fluid under controlled pressure, a flow restrictor connected between the gauging head and the supplying means and providing a pressure chamber therebetween, a plurality of diaphragms, housing means providing a chamber at one side of each of the diaphragms in communication with said pressure chamber, said housing means supporting an air leakage nozzle adjacent the other side of each of said diaphragms, said nozzles having different normal spacings from their respective diaphragms, means for supplying air under pressure to said nozzles and means for individually gauging the flow through said nozzles.

2. A gauging device as provided in claim 1, said gauging means comprising a plurality of pressure controlled electric switches connected to each of said nozzles.

3. In a device of the character described, a gauging head having flow controlling means providing for leakage of fluid supplied thereto and in which the amount of leakage varies with a characteristic of the object gauged, means for supplying fluid under pressure to said head, a flow restrictor between said supplying means and said flow controlling means, a plurality of fluid responsive diaphragms each connected at one side thereof between the flow restrictor and the flow controlling means, a chamber forming casing in which said diaphragms are supported, a plurality of air leakage nozzles supported by said casing one adjacent each of the other sides of said diaphragms so that flow through the nozzles depends on the deflection of their respective diaphragms, the normal spacing between a nozzle and its adjacent diaphragm being different than the normal spacing between the other nozzle and its adjacent diaphragm, means for supplying air under pressure to said nozzles, a fluid pressure responsive member connected to each of said nozzles and switch means controlled by each of said members and selectively operable in accordance with the amount of leakage at the gauging head.

4. For use in an air gauging device, a casing comprising a pair of end sections and an intermediate section, a pair of spaced flexible diaphragms each fixed at its peripheral portions between the intermediate section and one of said end sections, means for placing the intermediate section in communication with a pressure to be gauged for deflecting both of said diaphragms, fluid leakage nozzles supported by each of the end sections so the ends of the nozzles are normally slightly spaced at relatively different spacings from the respective diaphragms so that fluid flow from the nozzles is dependent on the deflections of the diaphragms and a passage communicating with each of said nozzles and adapted for connection to a source of pressure fluid and a flow gauging device.

5. For use in an air gauge wherein a variable fluid pressure is obtained in a flow path in accordance with the work controlled fluid leakage through an orifice, an amplifier comprising a diaphragm having one side in communication with the atmosphere, housing means supporting the diaphragm and providing a chamber at the other side thereof, means adapted for placing the chamber in communication with the variable pressure flow path, an air leakage nozzle adjacent the said one side of the diaphragm and controlled thereby to vary the rate of flow from the nozzle, said nozzle being adapted for connection to a gauging means and a source of fluid pressure for discharge of fluid against said diaphragm at a rate dependent upon the variable fluid pressure in the flow path.

6. For use in a gauge wherein a variable fluid pressure is obtained in a flow path in accordance with the work controlled fluid flow through a gauging head, an amplifier comprising a flexible diaphragm, an air leakage nozzle having a terminal end adjacent one side of said diaphragm and controlled thereby to vary the rate of flow from the nozzle, a housing supporting the peripheral portions of said diaphragm and supporting said nozzle and having an opening placing the nozzle side of the diaphragm in free communication with the atmosphere, said housing providing a chamber at the other side of the diaphragm, means adapted for placing said chamber in communication with the variable pressure flow path, and means adapted for connecting said nozzle to a gauging means and a source of fluid pressure for discharge of fluid against said fluid diaphragm at a rate dependent upon the variable fluid pressure in the flow path.

7. For use in a gauge wherein a variable fluid pressure is obtained in a flow path in accordance with the work controlled fluid flow through a gauging head, an amplifier comprising a flexible diaphragm, supporting means providing a housing for said diaphragm and a chamber at each side thereof, said supporting means having an opening placing the chamber at one side of said diaphragm in free communication with the atmosphere, means adapted for placing the chamber at the other side of said diaphragm in closed communication with the variable pressure flow path, an air leakage nozzle carried by said supporting means with the end of the nozzle within the chamber at said one side of the diaphragm, the nozzle end being adjacent said one side of the diaphragm and controlled thereby to vary the rate of flow from the nozzle, said nozzle being adapted for connection to a gauging means and a source of fluid pressure for discharge of fluid against said diaphragm at a rate dependent upon the variable fluid pressure in the flow path.

References Cited in the file of this patent

UNITED STATES PATENTS

| | | |
|---|---|---|
| 1,279,898 | Nixon | Sept. 24, 1918 |
| 1,843,068 | Von Wagenheim et al. | Jan. 26, 1932 |
| 1,949,559 | Campbell | Mar. 6, 1934 |
| 2,166,705 | Hochschulz | July 18, 1939 |
| 2,448,653 | Aller | Sept. 7, 1948 |
| 2,486,052 | Moore | Oct. 25, 1949 |
| 2,490,375 | Rupley | Dec. 6, 1949 |
| 2,538,622 | Johnson | Jan. 16, 1951 |
| 2,589,251 | Heinz | Mar. 18, 1952 |
| 2,618,965 | Gray | Nov. 25, 1952 |